United States Patent [19]

Bayer

[11] Patent Number: 5,799,870

[45] Date of Patent: Sep. 1, 1998

[54] THERMOPLASTIC RAILROAD TIE

[75] Inventor: John C. Bayer, Folsom, La.

[73] Assignee: Demer Corporation, Covington, La.

[21] Appl. No.: 843,823

[22] Filed: Apr. 21, 1997

[51] Int. Cl.$^6$ .................................................. E01B 3/44
[52] U.S. Cl. .................................................. 238/84
[58] Field of Search .......................... 238/83, 84, 85, 238/29

[56] References Cited

U.S. PATENT DOCUMENTS

| | | | |
|---|---|---|---|
| 4,070,201 | 1/1978 | Tessenske | 238/371 |
| 4,083,491 | 4/1978 | Hill | 238/98 |
| 4,108,377 | 8/1978 | Potter | 238/91 |
| 4,113,177 | 9/1978 | Collins et al. | 238/72 |
| 4,134,546 | 1/1979 | Dankert | 238/370 |
| 4,150,790 | 4/1979 | Potter | 238/83 |
| 4,160,761 | 7/1979 | Prusinski et al. | 428/150 |
| 4,286,753 | 9/1981 | Lee | 238/37 |
| 4,925,094 | 5/1990 | Buekett | 238/265 |
| 5,055,350 | 10/1991 | Neefe | 238/84 |
| 5,525,679 | 6/1996 | Effler, Jr. et al. | 525/334.1 |
| 5,609,295 | 3/1997 | Richards | 238/84 |
| 5,635,266 | 6/1997 | Quinn et al. | 428/57 |

*Primary Examiner*—S. Joseph Morano
*Attorney, Agent, or Firm*—Pravel, Hewitt & Kimball

[57] ABSTRACT

A composite railroad tie is provided comprising a phospho-gypsum filler and a thermoplastic resin. The composite exhibits desirable physical properties for railroad ties. Suitable sources for phospho-gypsum include fertilizer processes involving (a) providing phosphate rock, (b) contacting the phosphate rock with sulphuric acid in the presence of water to produce phosphoric acid and a calcium sulphate, (c) separating at least a portion of the phosphoric acid from the calcium sulphate to produce a phosphoric acid product and a calcium sulphate byproduct, (d) drying the calcium sulphate byproduct to remove water therefrom. The calcium sulphate byproduct (phospho-gypsum) is then admixed with a thermoplastic and a functionalized compound to produce a filled thermoplastic composition. The filled thermoplastic composition is then melt processed (for example injection or compression molded) to produce a filled thermoplastic composite railroad tie. The tie is a useful replacement for wood products having several physical property advantages and being suitable made from recycled plastic and waste byproduct filler.

5 Claims, 3 Drawing Sheets

THERMOPLASTIC RAILROAD TIE

BACKGROUND OF THE INVENTION

1. Field of the Invention

The present invention relates to thermoplastic railroad ties and processes for making thereof, and more particularly relates to thermoplastic composite railroad ties and processes for making thereof.

2. Description of the Related Art

In the railroad industry, the railroad tracks comprise metal rails supported on wooden ties. Historically, these wooden ties have exhibited limited useful lives due to their loss of properties upon extended use and extended exposure to environmental elements. The use of composite railroad ties has been disclosed in Neefe U.S. Pat. No. 5,055,350 issued Oct. 8, 1991 which discloses the making of railroad crossties from sand and recycled thermoplastic containers by coating the sand with an adhesive substance. The use of sand however can have various problems or disadvantages associated therewith including excessive weight, excessive abrasiveness when used in extrusion processes and when in contact with various processing equipment. Consequently, there is a need and a desire to provide composite railroad ties exhibiting certain enhanced properties.

In the fertilizer industry, materials used as sources of calcium and phosphorous are ground in mills and sifted to produce fine particles. For example, phosphate rock is ground to produce phosphate particles to be worked into the soil or for further processing with acids for the manufacture of fertilizers. A conventional process for using phosphate rock in the fertilizer industry, involves a wet process wherein the phosphate rock, $Ca_3(PO_4)_2$, is contacted with sulphuric acid and a byproduct of calcium sulphate is removed as gypsum($CaSO_4.2H_2O$) or hemihydrate ($CaSO_4.H_2O$) with residual levels of phosphate in the byproduct. In other words, the wet process byproduct typically comprises amounts of phosphorous compounds such as phosphates and/or phosphoric acid. The byproducts have had limited commercial utility, and accordingly have been at times stock piled as undesired waste product. Consequently, there is a need and desire to provide useful articles comprising these byproducts.

SUMMARY OF THE INVENTION

Figure 1:
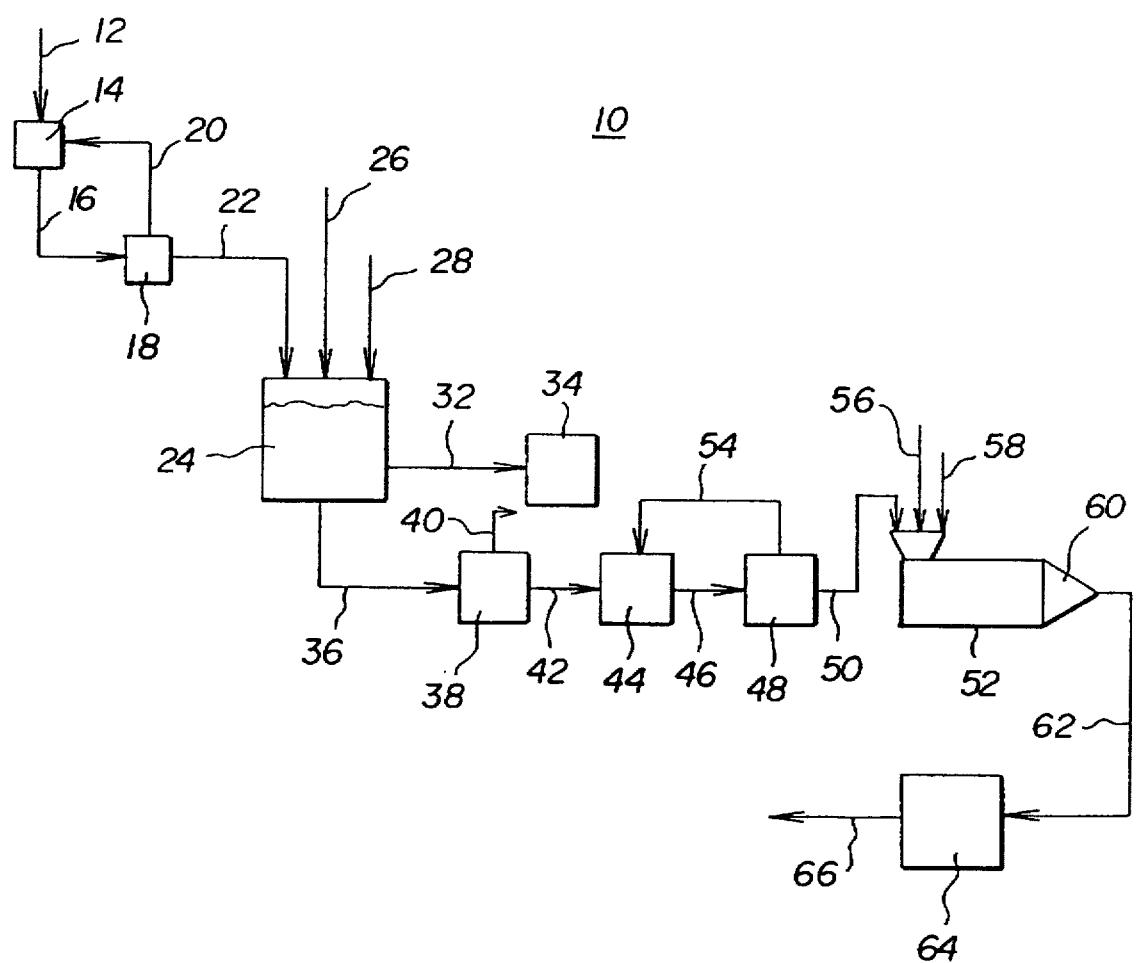
FIG. 1 is a schematic of a process for making thermoplastic composite railroad ties of the present invention.

A composite railroad tie is provided comprising a phosphogypsum filler and a thermoplastic resin. The composite is relatively dense and exhibits desirable physical properties for railroad ties. Suitable sources for phospho-gypsum include fertilizer processes involving (a) providing phosphate rock, (b) contacting the phosphate rock with sulphuric acid in the presence of water to produce phosphoric acid and a calcium sulphate, (c) separating at least a portion of the phosphoric acid from the calcium sulphate to produce a phosphoric acid product and a calcium sulphate byproduct, (d) drying the calcium sulphate byproduct to remove water therefrom. The calcium sulphate byproduct (phosphogypsum) is then admixed with a thermoplastic and a functionalized compound to produce a filled thermoplastic composition. The filled thermoplastic composition is then melt processed (for example injection or compression molded) to produce a filled thermoplastic composite railroad tie. The plastic effectively caps (traps, reduces escape of) undesired radon gases present in the byproduct.

DETAILED DESCRIPTION OF THE INVENTION

Composite thermoplastic railroad ties and processes for making thereof are provided. The thermoplastic railroad ties comprise (a) a thermoplastic resin (b) a filler comprising a calcium sulphate compound and a phosphate, and (c) a functionalized compound. The ties exhibit certain desired and enhanced properties over conventional wooden ties and over sand filled ties. The filler may be obtained by fertilizer manufacturing processed involving (a) providing phosphate rock, (b) contacting the phosphate rock with sulphuric acid in the presence of water to produce phosphoric acid and a calcium sulphate byproduct, (c) separating at least a portion of the phosphoric acid from the calcium sulphate to produce a phosphoric acid product and a calcium sulphate byproduct, and (d) drying the calcium sulphate byproduct to remove water therefrom. A thermoplastic filled composition is then made by admixing the calcium sulphate byproduct with a thermoplastic resin and a functionalized compound. The railroad tie may then be manufactured by melt processing (for example injection molding or compression molding or coextrusion) the thermoplastic composition.

Manufacturing of fertilizers from phosphate rocks by wet processes are well known. The processes involve (a) providing phosphate rocks and converting (reducing the size of )phosphate rocks into phosphate particulates, preferably by grinding, and preferably involves converting phosphate rocks having weight average diameter particle sizes of greater than 0.1 inches to small particulates having sizes of less than 0.01 inches, more preferably less than 0.005 inches, and most preferably less than 0.003 inches, for example into a weight average diameter particulate sizes of no greater than 60 mesh, more preferably no greater than 115 mesh, and most preferably no greater than 200 mesh. The smaller the particulate size, the greater the effective surface area to volume of the phosphate particulates for contacting with the sulphuric acid in the process. Various grinding and screening systems are suitable for converting phosphate rocks into phosphate particulates having the desired size. Grinding may be achieved by hammer mills, ring roller mills, and ball mills. Screening may be achieved by vibrating screens or other suitable screening devices.

The phosphate solids, preferably in the form of small phosphate particulates, are then contacted with sulphuric acid to the presence of water to form a reaction mass resulting in the production of (formation of) phosphoric acid and a calcium sulphate, as is known in the art. The calcium sulphate typically takes the form of gypsum and/or hemihydrate. The calcium sulphate is then removed from the reaction mass to yield a phosphoric acid product and a calcium sulphate byproduct. Typical calcium sulphate byproducts from this step contain amounts of water and phosphate, and are typically stock piled as an undesired waste product.

In the present process the calcium sulphate byproduct is then dried (dewatered) to produce a calcium sulphate/ phosphate product having preferably having less than 1 percent by weight water, more preferably less than 0.5% water, and most preferably less than 0.1% by weight water based on the total weight of the solid byproduct. Drying the product reduces the risk of undesired thermoplastic degradation in the process due to the presence of high levels of residual water and high temperatures in the presence of ingredients in the composition. Other fillers such as fluorogypsums, calcium fluoride, calcium difluoride, fluorspar, barites, barytes, barium sulphate (BaSO4) and mica may be used a portion of the inorganic material.

The process further involves admixing, preferably melt mixing, (a) the byproduct (calcium sulphate compound/phosphate byproduct (mixture)), (b) a thermoplastic resin and (c) a functionalized compound to produce a filled thermoplastic composition. Optionally, fiber (metal or glass) reinforcing agents may admixed into the composition.

The filled thermoplastic resin composition may then be processed to form a thermoplastic filled composite railroad ties. The ties may be then used to support rail in the making of railroad tracks.

The thermoplastic composition preferably comprises (a) a polyolefin resin present at a level of from 10 to 99 percent by weight based on the total weight of the composition, (b) a fertilizer wet process byproduct (filler comprising calcium sulphate and phosphate, and optionally other fillers may be utilized comprising calcium fluoride, synthetic fluorspar, calcium difluoride or fluorogypsum) present at a level of from 1 to 90 percent by weight based on the total weight of the composition, and (c) a functionalized compound present at a level of from 0.5 to 10 percent by weight based on the total weight of the composition.

The polyolefin polymers include polymers of monoolefins and diolefins, for example polypropylene, polyisobutylene, polybutene-1, polymethylpentene -1, polyisoprene or polybutadiene, as well as polymers of cycloolefins, for instance of cyclopentene or norbornene, polyethylene, for example high density polyethylene, low density polyethylene and linear low density polyethylene may be used. Mixtures of these polymers, for example mixtures of polypropylene with polyethylene and mixtures of different types of polyethylene, may also be used. Also useful are copolymers of monoolefins and diolefins with each other or with other vinyl monomers, such as, for example, ethylene/propylene, linear low density polyethylene and its mixtures with low density polyethylene, propylene/butene-1, ethylene/hexene, ethylene/ethylpentene, ethylene/heptene, ethylene/octene, propylene/isobutylene, ethylene/butane-1, propylene/butadiene, isobutylene/isoprene, ethylene/alkylacrylates, ethylene/alkyl methacrylates, ethylene/vinyl acetate or ethylene/acrylic acid copolymers and salts thereof and terpolymers of ethylene with propylene and a diene, such as hexadiene, dicyclopentadiene or ethylidene-norbornene, as well as mixtures of such copolymers and their mixtures with polymers mentioned above, or example polypropylene/ethylene-propylene-copolymers, low density polyethylene/ethylene vinyl acetate. Also suitable are polyvinyl chlorides.

Most preferably the thermoplastic resin is a recycled polyolefin resin. The preferred recycled thermoplastic resin is a recycled polyolefin, and most preferably is a recycled high density polyethylene.

Suitable functionalized compounds include epoxidized oils such as epoxidized esters of unsaturated fatty acid which may be made by reacting alcohols with unsaturated fatty acids to produce esters of unsaturated fatty acids, followed by epoxidizing the esters of unsaturated fatty acids. The epoxidizing may be accomplished by treating the ester of an unsaturated fatty acid with a peroxy organic acid, such as perony acetic acid. Suitable alcohols include mono-ols, diols, triols such as glycerols, and higher polyols. Suitable unsaturated fatty acids include mon and poly (di, tri, and higher) unsaturated fatty acids such as oleic acid, linoleic acid, linolenic acid, and arachidonic acid. Naturally occurring esters of unsaturated fatty acids, more particularly glycerides of unsaturated fatty acids, include vegetable oils (chiefly from seeds or nuts), including soybean oil, linseed oil, and cottonseed oil. Generally unsaturated fatty acids have from 4 to 24 carbon atoms. The most preferred epoxidized esters of unsaturated fatty acid is expoxidized soybean oil. Soybean oil is predominantly triglycerides of oleic acid, triglycerides of linoleic acid and triglycerides of linolenic acid. The thermoplastic compositions may also contain metal chelates such as titanium chelates to enhance the properties of the filled composition. Examples of titanium chelates are those represented by the general formulas $(HOYO)_2Ti(OR)_2$ or $(H_2NYO)_2Ti(OR)_2$ wherein Y and R are selected from hydrocarbon groups, preferably C1 to C20 alkyl groups, and more preferably C2 to C8 alkyl groups and titanium chelates include, but are not limited to octylene glycol titanate and triethanolamine titanate, and most preferably is octylene glycol titanate. Titanium chelates are commercially available, for example a titanium chelate is available fro Dupont in Mexico under the trademark Titantus. A suitable titanium chelate is isopropyl triisostearoyl titanate $CH_3 (CH_3)(CHOTi(OC(O) C_{17}H_{35})_3$. Amounts of mineral oil may also be present.

The plastic compositions may optionally contain flame retardants such as halogenated materials, preferably chlorinated or brominated compounds. The filler of the present invention is of a nature containing phosphates which provides the potential additional advantage of added flame retardency in the composition. Suitable flame proofing additives include low molecular weight bromine compounds, and examples include octabromodiphenyl ethers, tetrabromophthalimide, tribromophenoxymehtane, bis (tribromophenoxy)ethane, poly or oligomeric tetrabromo-bisphenol A, tris (tribromophenyl) triphosphate, trichlorotetrabromotoluene, hexabromocyclododecane and decabromodiphenyl ether.

The process of the present invention allows for the production fertilizer without the undesired stock piling (or solid waste disposal) of solid byproducts. The present process allows the combined production of fertilizer and useful railroad tie materials. The presence of the phosphate in the byproduct also provides for possible enhancement in the flame retardancy of the product without the additional expense of purchasing a phosphate flame retardant.

Various other additives such as pigments, dyes, and oxidants, ultraviolet light stabilizers, etc. may be present in the composition or the composition may be free from such additional additives.

The thermoplastic compositions may further comprise neutralizers, primary antioxidants, secondary antioxidants and light stabilizers such as hindered amine light stabilizers.

The polyolefin resin in preferably present at a level of from 10 to 99 percent by weight based on the total weight of the composition, more preferably from 25 to 80 percent by weight thereof, and most preferably from 40 to 75 percent by weight thereof. The byproduct compound (filler) is preferably present at a level of from 1 to 90 percent by weight based on the total weight of the composition, more preferably from 20 to 75 percent by weight thereof, and most preferably from 25 to 60 percent by weight thereof. The functionalized compound (epoxidized oil) is preferably present in the composition at a level of from 0.5 to 8 percent by weight based on the total weight of the composition, more preferably from 1 to 5 percent by weight thereof, and most preferably from 2 to 4 percent by weight thereof. If the calcium titanate is used, it is preferably used at levels of from 100 ppm to 2000 ppm based on the total weight of the composition. Surprisingly and unexpectedly, the fertilizer waste byproduct comprising calcium sulphate and phosphate when used in the present composition provides a filled thermoplastic composition exhibiting suitable physical characteristics for railroad ties, even at high loading levels of the waste byproduct in the composition. The composition may further contain reinforcing fiber, such as glass, metal or vegetable fiber (sugar cane bagasse) at levels of from 1 to 10 percent by weight based on the total weight of the composition, more preferably from 2 to 8 percent by weight thereof, and most preferably from 3 to 7 percent by weight thereof. The use of sugar cane bagasse, allows the utilization of three waste products, while producing a railroad tie product exhibiting useful physical properties. Thus in an agricultural setting, the waste product of the fertilizer manufacturing process, and the waste product of the sugar manufacturing process, can both be utilized together to produce useful railroad ties. In other words, the present invention provides a solution to waste products from the above processes, while producing railroad ties.

Suitable railroad ties may for example have lengths of from 6 feet to 8 feet and widths of from 8 inches to 12 inches and heights of from 5 inches to 10 inches. The railroad ties (66) preferably have two spaced apart rectangular vertical sides (106, 108), a horizontal rectangular top (110) and a horizontal rectangular bottom (112) spaced apart from the top (110), and a pair of vertical rectangular ends (114,116) extending between the sides (106,108) and the top (110) and bottom (112). The weight of the railroad tie may range from 40 pounds to 80 pounds depending on the level of filler in the composition and whether metal reinforcing bar is used.

As shown in FIG. 1, the process of the present invention involves a process for manufacturing fertilizer which utilizes the byproduct thereof, and more specifically involves (a) fertilizer manufacturing system (10) wherein phosphate rock (12) (phosphate rock stream (12)) is fed to a size reducing device (14) (grinder (14)) for reducing the phosphate rock into small size particulates which are then fed as intermediate stream (16) to a first screening unit (18) for separating intermediate phosphate stream (16) into (i) a large particle return stream (20) which is returned to the grinder (14) for further size reduction and (ii) a stream (22) of small particulates. The small particulates are then fed to a reaction vessel (24), and a water feed stream (26) and a sulphuric acid feed stream (28) are also fed to the reaction vessel to form a reaction mass (30). In the reaction mass (30) the phosphate rock and the sulphuric acid react to form liquid (aqueous) phosphoric acid and a solid calcium sulphate (gypsum and/or hemihydrate). The liquid phosphoric acid is removed from the vessel (24) as phosphoric acid stream (32) and is retained in a holding container (34) and is used as a fertilizer product, typically after being admixed with other conventional fertilizer elements. The solid calcium sulphate is removed from the vessel (24) as initial calcium sulphate stream (36) which contains undesirably high levels of water (typically in excess of 1 percent by weight based on the total weight of the initial calcium sulphate byproduct). The initial calcium sulphate stream (36) is then fed to a dewatering unit (38) wherein water is removed as water waste stream (40) and a dewatered calcium sulphate stream (42) exits the unit (38). The dewatering unit (38) may be in the form of a press or a heat drying unit or an air drying system, and preferably the dewatered calcium sulphate (42) has a water content of less than 1 percent by weight based on the total weight of the dewatered calcium sulphate. If the drying unit (38) undesirably causes particulate aggregation, then the system preferably further involves a calcium sulphate grinder (44) for reducing the particle size of the aggregated calcium sulphate to produce (I) a reduced particle size intermediate calcium sulphate stream (46) which is fed to a screening device (48) for separating the stream (46) into a small particulate (byproduct stream) (50) which is fed to an extruder (or other melt mixing device) (52) and (ii) a return calcium sulphate stream (54) of relatively larger size particles for return to the grinder (44) for size reduction.

The extruder (52) may be a conventional melt extruder for filled thermoplastics and contains conventional heating and cooling controls for maintaining the extruder within a temperature range suitable for melt processing of the composition. The extruder (52) has an intake throat (54) for receiving the byproduct particulates (50), and for receiving respective amounts thermoplastic resin by resin stream(56) and functionalized compound (epoxidized oil) by functional compound stream (58). The extruder then melt mixes the particulates, resin and functionalized compound and forces the resulting resin composition through a die (60) with a cutting element resulting in pellets (62) (final resin product/article stream (62)). The process further involves a melt processing unit (64) such as an injection molding machine or a compression molding machine to produce the railroad ties (66).

The calcium sulphate byproduct comprises (a) a calcium sulphate and (b) a phosphate. The calcium sulphate is present in the byproduct composition at a level of from 50 percent by weight to 99 percent by weight based on the total weight of the byproduct composition, more typically from 60 to 98 percent by weight thereof, and even more typically from 75 to 95 percent by weight thereof. The phosphate is present in the byproduct composition at a level of from 1 to 50 percent by weight based on the total weight of the byproduct composition, more typically from 2 to 40 percent by weight thereof, and even more typically from 5 to 25 percent by weight thereof. The calcium sulphate may be in the form of gypsum or hemihydrate, in other words the calcium sulphate may be in the form of (CaSO4, CaSO4.H2O, CaSO4.2H2O or mixtures thereof).

Figure 2:
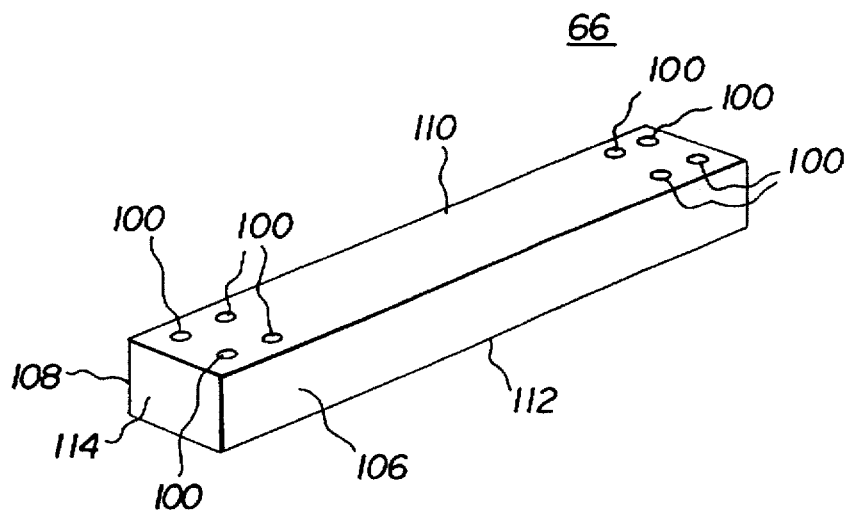
FIG. 2 is a perspective view of a composite railroad tie of the present invention.
Figure 3:
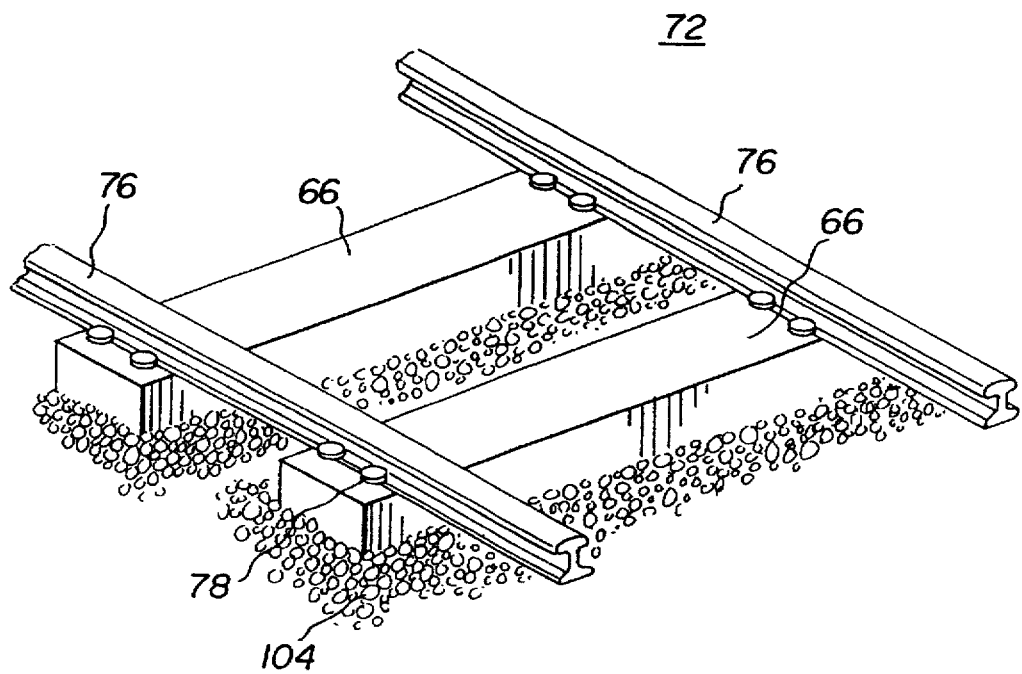
FIG. 3 is a perspective cutaway view of a railway according to the present invention.
Figure 4:
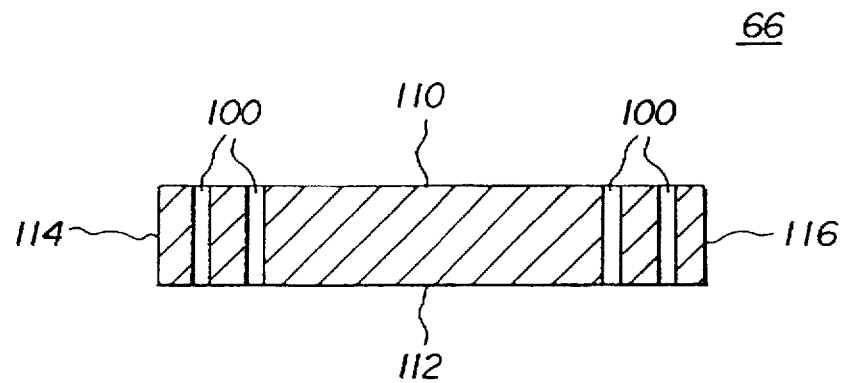
FIG. 4 is a vertical cross-sectional view of the railroad tie of FIG. 1.
Figure 5:
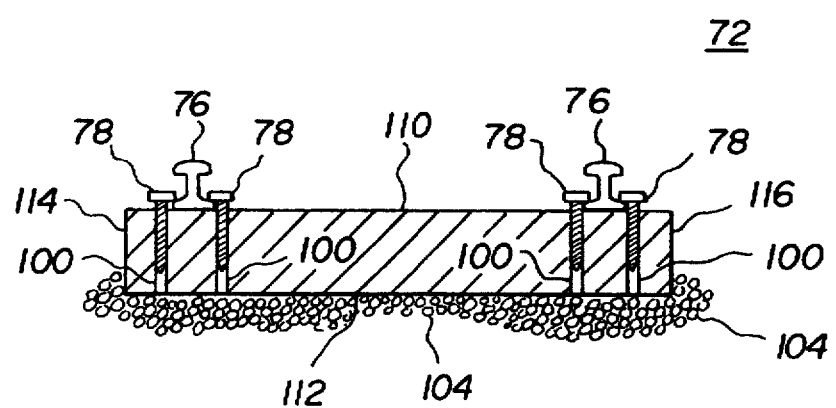
FIG. 5 is a vertical cross-sectional cutaway view of railway of FIG. 3.

As shown in FIG. 2, the railroad tie (66) may generally be similar in exterior shape to the shape of a conventional railroad tie. The tie (66) may have various additional features not present in conventional ties, specifically the tie may have holes (100) (two sets of four spaced for receiving lag (carriage) bolts (timber screws)(78) )extending vertically therethrough. Each set of four holes has two pair spaced apart for being positioned on opposite sides of the rail (76) and adjacent thereto. FIG. 3 is a perspective view of a railway (72) which comprises the present ties (66) and rails (76) and rail bolts (78) or other suitable holddown devices for holding the rails (76) in position relative to the ties (66) and relative to the road bed (82) on which the ties (66) are supported. As shown in FIGS. 3 and 5 the ties are supported on a railbed (104) and are partially embedded therein for reducing movement of the ties (66). FIG. 4 is a vertical cross-sectional view of the railroad tie and shows the optional holes (100) for receiving the bolts (78) for holding the rail in position relative to the ties (66). FIG. 5 is a vertical cross-sectional view of the railway (72). Prior railways are disclosed in Tamas et al U.S. Pat. No. 5,163,614 issued Nov. 17, 1992 and Braitsch, et al U.S. Pat. No. 4,500,037 issued Feb. 19, 1985, both of which are incorporated herein by reference. The compositions of the present invention exhibit desired properties for railroad ties, including tests such as bolt pull tests and compression tests (properties). It appears that the crystalline nature of the crystalline filler of the present invention provides enhanced properties in the railroad tie formulations compared to the properties that would be attained by using a filler such as sand. The compositions of the present invention appear to provide a compressional strength in excess of the compression strength of oak, for example a factor of about 10 times the compressional strength of oak as measured by ASTM test, and the retentional strength of the composite is desirable as is required for holding leg-bolts to rails of railroad tracks. The use of the waste byproduct also provides the advantage of finding a desirable use for the byproduct. The present material is also relatively resistant to attack from organisms and does not require the use of preservatives such as creosote.

Conventional railroad crossings have historically been the scene of numerous undesired collisions between trains and automobiles. Consequently, there is a desire to enhance train engineer and automobile driver awareness of the existence of each crossing location. The present invention further involves the use of a yellow colorant (dye or pigment, conventional yellow dyes and pigments for thermoplastics may be used) in the thermoplastic compositions for making of the tie and for use in the process during admixing to provide a yellow colored tie for use at the intersection and before (within 0.5 miles) of the intersection where a road (highway) crosses a railroad track. The bright yellow ties at the intersection provide motorists with additional visual stimuli for the purpose of enhancing awareness of the existence of the crossing, and the yellow ties located at positions before (within 0.5 miles of the intersection) provide the engineer with addition warning of the existence of the intersection.

EXAMPLES

Formulation #1 was made by admixing: Phospho gypsum (a fertilizer process byproduct blend of calcium sulphate and phosphate) 23.5 pounds, recycled high density polyethylene 16 pounds, epoxidized soybean oil 225 grams and a titanium chelate (TITANOS) 0.45 grams. The phospho gypsum and recycled high density polyethylene were dry mixed for 5 minutes. The epoxidized soybean oil and the chelate were blended for two minutes. The epoxidized soybean oil and chelate mixture was slowly added to the dry mixture of phospho gypsum and recycled polyethylene while it was mixing in the mixer. The time of mixing all ingredients together was 10 minutes (until compound was thoroughly mixed).

Formulation #2 was made by mixing: phospho gypsum 22.5 pounds, recycled high density 16 pounds, epoxidized soybean oil 225 grams, titanium chelate 0.45 grams and sugar cane bagasse 1 pound. The phospho gypsum, bagasse and recycled high density polyethylene were dry mixed for 5 minutes. The epoxidized soybean oil and titanium chelate were slowly added to the dry mixture of phospho gypsum, bagasse and polyethylene while it was mixing in the mixer. The time of mixing all ingredients together was about 10 minutes (until the compound was thoroughly mixed). Both formulas 1 & 2 were then processed into small pellets and then processed through a small extrusion machine and a 2 inch by 2 inch by 12 inch long sample was produced.

The presence of fluorine containing compounds in some fertilizer by products is well known and may be referred to as fluorogypsum. Fluorogypsum may also be generated by other processes such as a byproduct produced from the reaction of fluorspar with sulfuric acid in the production of hydrofluoric acid, see Azar Fluorogypsum Waste Solidification Material U.S. Pat. No. 4,935,211 issued Jun. 19, 1990 which is incorporated herein by reference. Fluorogypsum contains mostly calcium sulfate anhydrite and calcium sulfate having water chemically combined therewith, plus small quantities of fluorine containing compounds and possibly small concentrations of sulfuric acid. Disposal ponds for fluorogypsum occupy large areas of useful land and commonly require monitoring and maintenance by the owner. The disposal ponds are constantly increasing in size and quantity of fluorogypsum contained as the related production processes continue. Consequently, there is a problem with the continued accumulation of these byproducts and a need and desire to find a useful product which uses these materials. Fertilizer related processes producing fluorogypsum materials are known, see for example Sardisco et al Recovery of Fluorides From Gypsum U.S. Pat. No. 4,060,586 issued Nov. 29, 1977, Johnson U.S. Pat. No. 4,175,944 issued Nov. 27, 1979, Gaynor et al U.S. Pat. No. 4,402,922 issued Sep. 6, 1983 and Czysch et al Production of Low-Fluorine Gypsum as a By-Product in a Phosphoric Acid Process U.S. Pat. No. 4,026,990 issued May 31, 1977, all of which are incorporated herein by reference.

Test pieces were made with comparative amounts of calcium carbonate as the filler and the phosogypsum filler of the present invention provide a product having superior levels of rigidity over the calcium carbonate material.

Suitable compositions for use in the manufacture on railroad ties were made and included admixing 10.5 pounds of phosphogypsum, 4.5 pounds of high density polyethylene (RHDPE), 52.08 grams of epoxidized soya oil and 18.75 grams of titanate.

From exposure evaluations (LSU Nuclear Science Department on behalf of applicant) resulting from the manufacturing and use of phosphogypsum/plastic composite railroad ties, the MREM/YR for radon was less than 0.1 for railroad construction group, homes 50 ft from railroad, near stored ties 1 meter away and near stored ties 10 meters away, and nil for the groups of extruder operator, worker near starting material hopper and railroad passenger based on the resin effectively encapsulates the waste byproduct reducing the potential exposure to radon gases from the byproduct.

What is claimed is:

1. A railroad tie made by melt processing a thermoplastic composition comprising:
   (a) a thermoplastic resin,
   (b) an epoxidized oil, and
   (c) a calcium sulphate composition comprising
      (i) a calcium sulfate present at a level of from 50 to 99 percent by weight based on the total weight of the calcium sulfate composition and
      (ii) a phosphate present at a level of from 1 to 50 percent by weight based on the total weight of the calcium sulfate composition.

2. The tie of claim 1 wherein said thermoplastic resin is a polyolefin.

3. The tie of claim 1 wherein said epoxidized oil is an epoxidized soybean oil.

4. The tie of claim 1 wherein said thermoplastic resin is present at a level of from 40 to 75 percent by weight based on the total weight of the thermoplastic composition, said calcium sulphate composition being present at a level of from 25 to 60 percent by weight based on the total weight of the thermoplastic composition, and said epoxidized oil being present at a level of from 0.5 to 8 percent by weight based on the total weight of said thermoplastic composition.

5. The tie of claim 1 wherein said tie comprises holes for receiving carriage bolts for securing said rail to said tie.

* * * * *